(12) United States Patent
Hwang

(10) Patent No.: US 7,071,981 B1
(45) Date of Patent: Jul. 4, 2006

(54) IMAGE SENSING SYSTEM AND METHOD

(75) Inventor: Bor-Yuan Chester Hwang, Tempe, AZ (US)

(73) Assignee: MagnaChip Semiconductor, Ltd. (KR)

( * ) Notice: Subject to any disclaimer, the term of this patent is extended or adjusted under 35 U.S.C. 154(b) by 744 days.

(21) Appl. No.: 10/188,601

(22) Filed: Jul. 1, 2002

(51) Int. Cl.
*H04N 5/335* (2006.01)

(52) U.S. Cl. ..................... 348/308; 345/302
(58) Field of Classification Search ........... 348/302, 348/308; 257/291
See application file for complete search history.

(56) References Cited

U.S. PATENT DOCUMENTS

| 5,835,141 | A | * | 11/1998 | Ackland et al. | ............ 348/308 |
| 5,881,184 | A | * | 3/1999 | Guidash | ................ 382/321 |
| 6,452,633 | B1 | * | 9/2002 | Merrill et al. | ............... 348/302 |
| 6,847,070 | B1 | * | 1/2005 | Fox | ............................ 257/291 |

* cited by examiner

*Primary Examiner*—Tuan Ho
(74) *Attorney, Agent, or Firm*—Fernandez & Associates, LLP.

(57) ABSTRACT

A cost-effective image capture apparatus is presented which achieves high shutter speed without blurring the captured image or introducing noise. The apparatus uses standard 4T pixels to store exposure information on the pixel itself and employs a near simultaneous reset mechanism to reset the pixels, thereby achieving high-speed image capture without increasing the per pixel die area for extra storage or incurring unwanted current spikes and noise due to simultaneous resets.

45 Claims, 3 Drawing Sheets

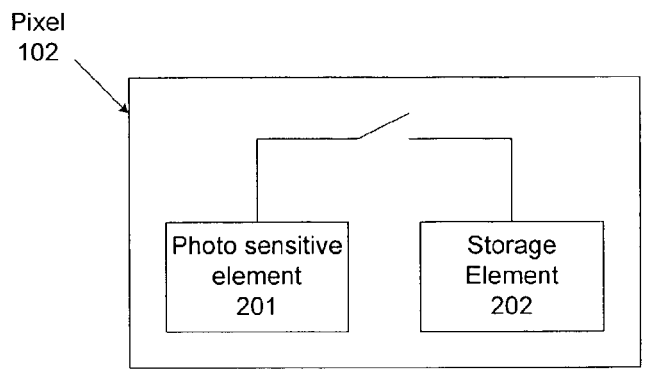
200  Figure 2
4T Pixel
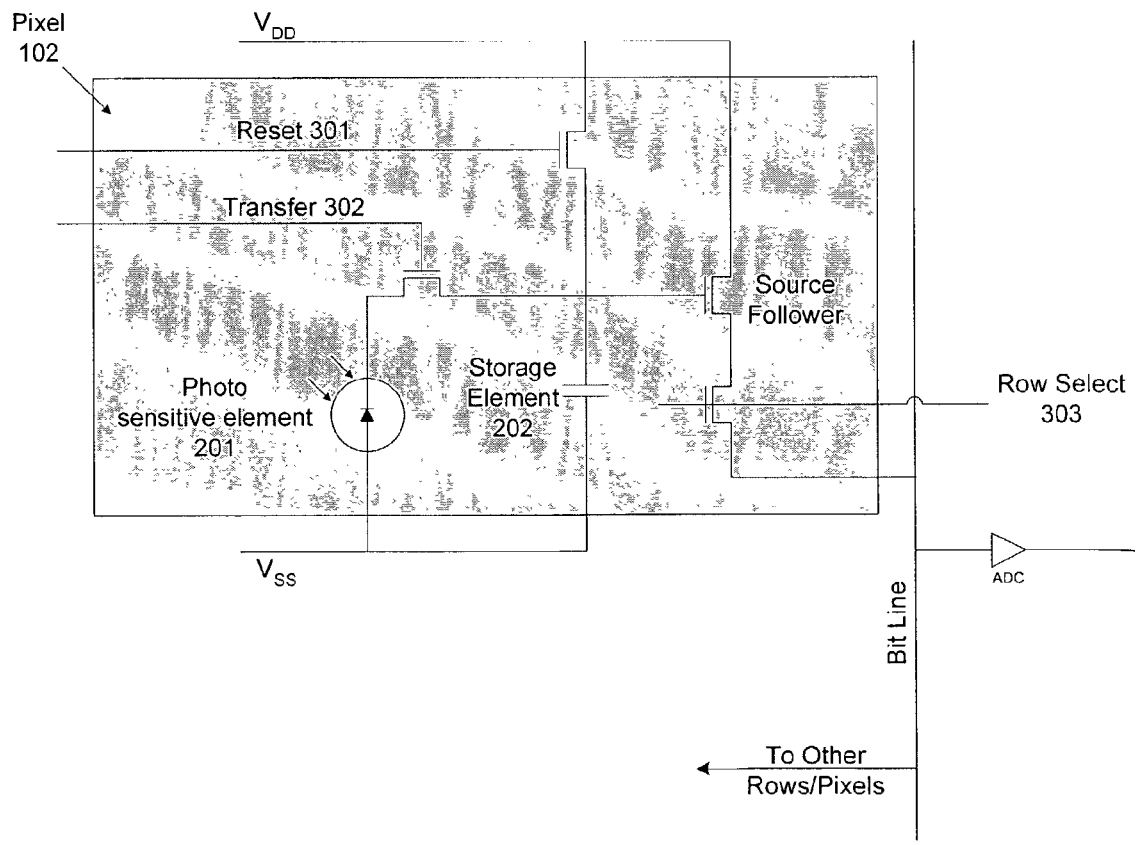
300  Figure 3

IMAGE SENSING SYSTEM AND METHOD

BACKGROUND INFORMATION

1. Field of Invention

The invention relates to the field of image sensors, and in particular to the high-speed image capture capability of image sensors.

2. Description of Related Art

Current image sensors are not able to achieve high-speed image capturing capability due to the time needed to read each line of data in the image array in a progressive manner from top to bottom of the array. For example, if the frame rate of an image sensor is 30, it will take 1/30 of a second to reset (or read) from the first line to reset (read) the last line of the image sensor array. This will cause a fast moving image to blur.

A typical approach to address this issue adds a storage element inside each pixel of the sensor array. The data in all the pixels are simultaneously transferred to the storage elements and subsequently read out to achieve a high-speed shutter effect.

This approach has two major shortcomings. First, the increase in per pixel area due to the added storage element increases total die size and with it the cost. Second, the simultaneous switching of the entire array of pixels will introduce current and noise spikes and thereby degrade image quality. A need exists for a high-speed image capture apparatus which uses standard pixels and hence does not increase the per pixel area, and which alleviates large current spikes and noise.

SUMMARY OF INVENTION

The present invention discloses a system for high-speed image capture, comprising: a clock; a plurality of pixels, a pixel having a photo sensitive element and a storage element, said photo sensitive element producing output indicative of incoming light, wherein said pixels are arranged in pixel groups; and a control element coupled to the plurality of pixels, wherein the control element resets the pixel groups iteratively and at the rate of one pixel group per c clock cycles, and transfers the outputs of the photo sensitive elements of the pixels to the storage elements of the respective pixels, said transfer proceeding at the rate of one pixel group per c' clock cycles and occurring simultaneously for all pixels in a pixel group. In one embodiment, a high-speed image apparatus and method uses a 4-transistor (4T) pixel to store data without increasing pixel area and incurring an increase in die size and cost. In addition, the high-speed image capture is achieved without large current spikes or noise.

BRIEF DESCRIPTION OF DRAWINGS

FIG. 2 is a block diagram illustrating an abstract pixel having a photo sensitive element and a storage element.

FIG. 3 is a circuit diagram illustrating a standard 4T pixel and connections to external control signals as used in a preferred embodiment of the present invention.

DETAILED DESCRIPTION OF PREFERRED EMBODIMENT(S)

Figure 1:
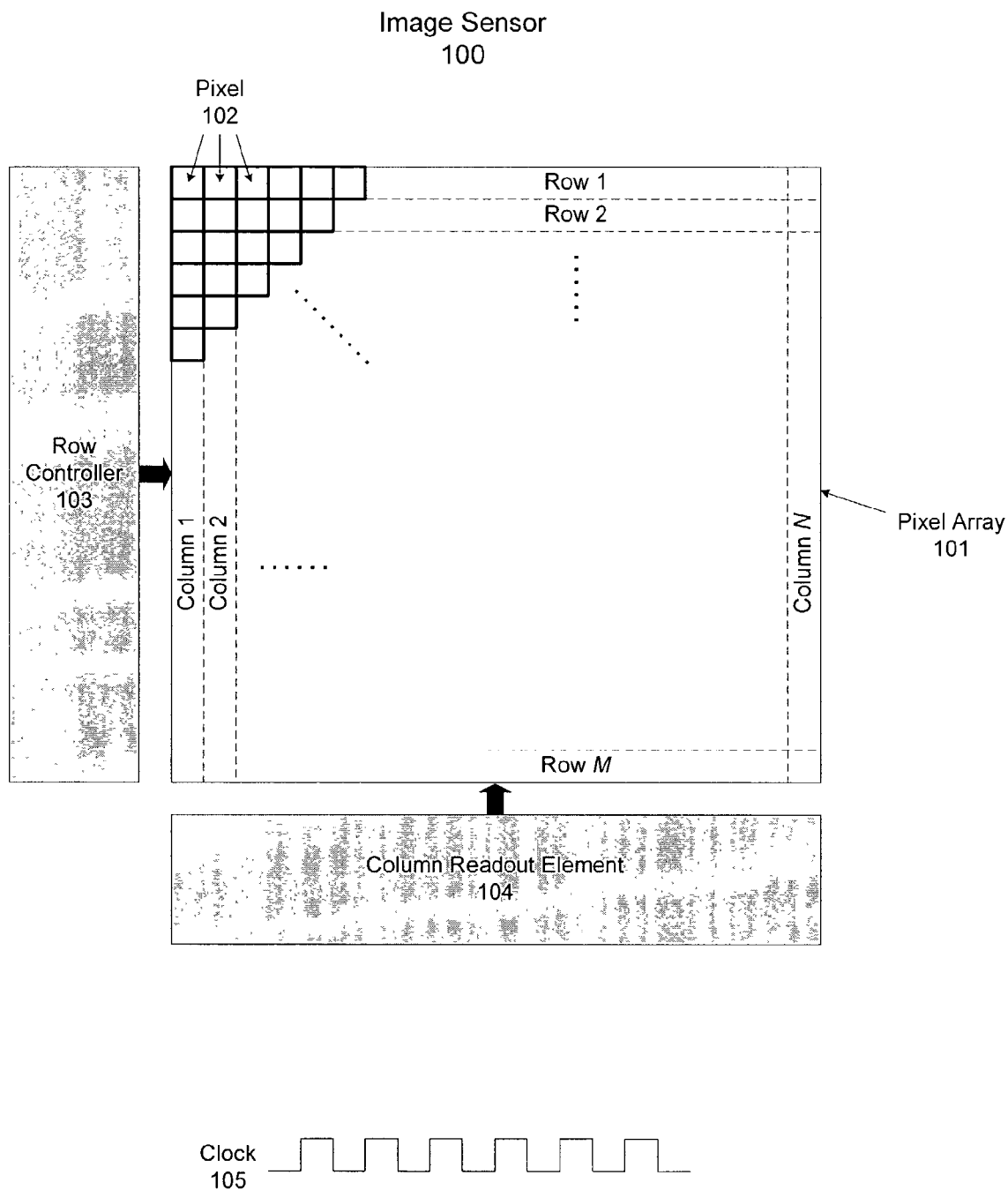
FIG. 1 is a diagram illustrating an array of 4T pixels according to a preferred embodiment of the present invention.

FIG. 1 shows an image sensor 100 in accordance with a preferred embodiment of the present invention. An array 101 of pixels 102 is arranged in M rows and N columns, such as M=1024 rows by N=1280 columns, or any other dimensions depending on application. Row controller 103 couples to pixel array 101 and supplies control signals to pixel array 101. Column readout element 104 couples to pixel array 101 and performs readouts from pixel array 101. The timing of the present invention proceeds according to a clock 105, such as one operating at 48 MHz or some other frequency depending on application. As shown in FIG. 2, pixel 102 has a photo sensitive element 201, such as a photodiode or a photogate or a PIN diode, as well as an internal storage element 202, such as a capacitor. Preferably, pixel 102 is a 4T pixel with a photo sensitive element 201, a storage element 202, a Reset control line 301, a Transfer control line 302, and a Row Select control line 303, as shown in FIG. 3. Having storage element 202 within pixel 102 prevents increase of the pixel substrate area (die size) and hence reduces cost.

To initiate a high-speed image capture of a given target image, pixels 102 in pixel array 101 must first be reset, wherein both the photo sensitive element 201 and the storage element 202 are reset. Row controller 103 preferably resets one row of the pixel array 101 per clock cycle, starting with Row 1 and proceeding downwards ending with Row M, resulting in a high-speed reset of the pixel array 101 in only M clock cycles. For example, for M=1024 rows and a clock frequency of 48 MHz, pixel array 101 will be reset in under 22 µm. Alternatively, row controller 103 simultaneously resets m rows of the pixel array 101 per c clock cycles, wherein m and c are constants such that $1 \leq m \leq M$ and $c > 0$, and wherein m is chosen not to be so large as to introduce unacceptable levels of current spikes and noise. It is understood that the last batch of rows to be reset can have fewer than m rows (when m does not divide M). Resetting a row is accomplished by simultaneously activating the Reset control line 301 of each pixel 102 in the row.

Once the pixel array is reset, an exposure period follows during which photo sensitive elements 201 in pixels 102 of pixel array 101 are charged up as a result of exposure to a target image. The exposure period varies based on the level of target image illumination and particular application. For example, the brightness of a target image in a typical sunny day can be about 50,000 lux, which will require about 100 µs of exposure time. One of ordinary skill in the art would know that low target image illumination results in a dark but still un-blurred image.

Following the exposure period, row controller 103 iterates through the rows of pixel array 101 one row at a time, triggering the transfer of row pixels' 102 exposure information from the photo sensitive elements 201 into the storage elements 202 of the respective pixels 102, resulting in the high-speed capture of a low-blur image. For example, for M=1024 and a clock frequency of 48 MHz, the exposure information stored in any two pixels' 102 storage elements 202 will never span a period longer than 22 µs of the life of the target image, thereby resulting in very little blur in the recorded exposure information. The triggering of the transfer is achieved by activating the Transfer control line 302 of the respective 4T pixels 102. Alternatively, row controller 103 iterates through the rows of pixel array 101 at the rate of m'rows per c'clock cycles, triggering the transfer of m' rows' pixels' 102 exposure information from the photo sensitive elements 201 into the storage elements 202 of the respective pixels 102, wherein m'>1 may or may not equal m and c' may or may not equal c.

Once all pixels 102 of pixel array 101 have been exposed to the image and have stored the captured exposure information in their respective storage elements 202, a readout period follows in which row controller 103 activates the Row Select 303 control line of Row 1 and transfers the exposure information stored in the pixels' 102 storage elements 202 of Row 1 to column readout element 104. This process iteratively transfers the exposure information of all rows to column readout element 104. Column readout element 104 then transfers the exposure information to a storage element, either integrated on a chip or external, such as a disk drive or hard drive or RAM, or alternatively transfers the exposure information to a processing element, either integrated on a chip or external, such as an ASIC or a general purpose computer, or alternatively transfers the exposure information to a display element such as a computer display or a digital camera view finder, or alternatively relays the exposure information to a network (optionally a wireless network) via an interface coupled to the image sensor 100, or alternatively transfers the exposure information to any device or element or interface coupled to the image sensor 100, wherein said device or element or interface receives the exposure information from image sensor 100. A second clock is optionally added, separate and distinct from the first clock or triggered off the first clock, optionally operating at a different clock rate from the first clock and feeding into column readout element 104 for purposes of sampling exposure information into digital representation (using an analog-to-digital converter), with the clock rate of the second clock depending on bit resolution of the conversion.

Figure 4:
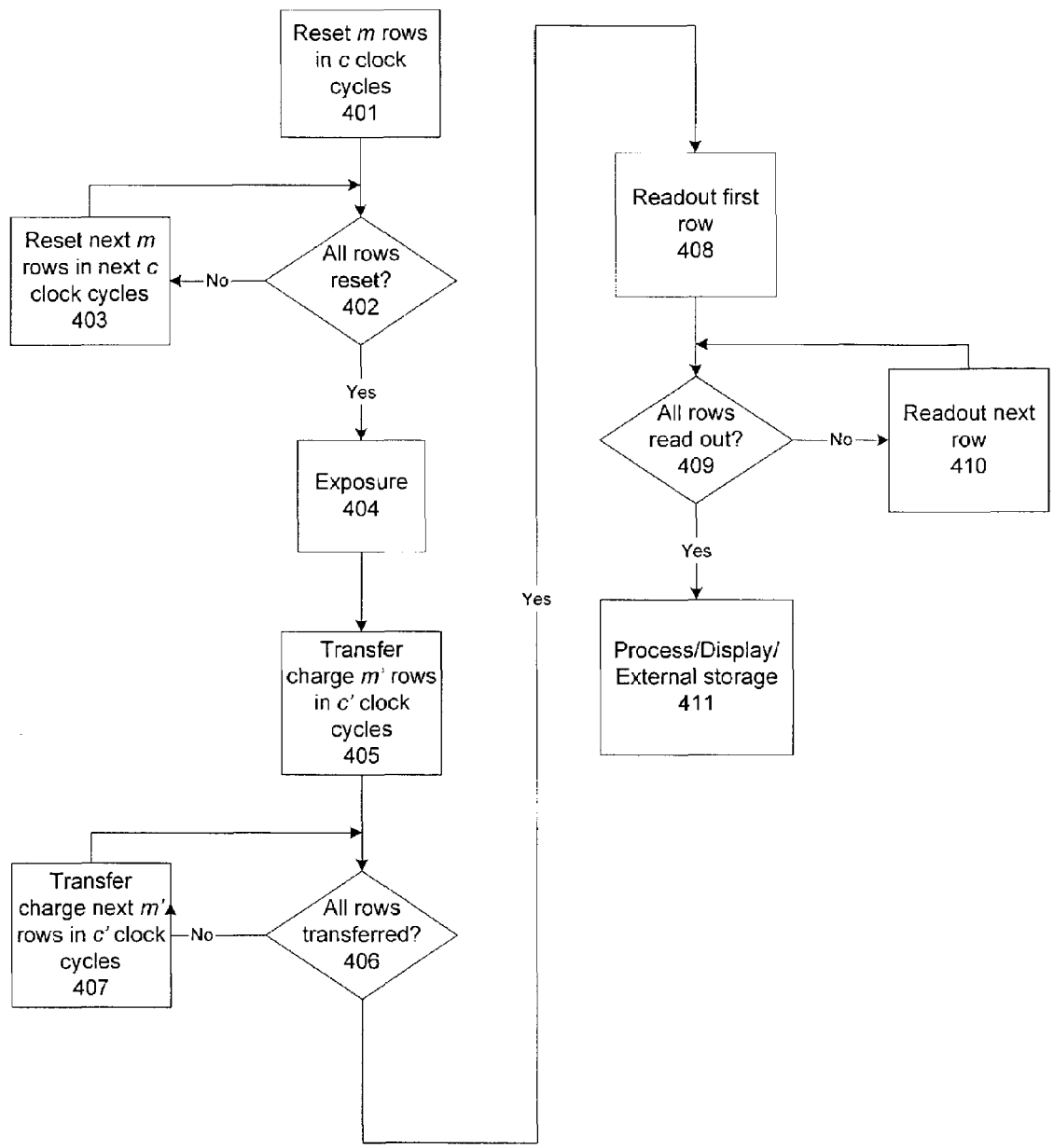
FIG. 4 is a flow diagram illustrating a method for high-speed image capture in accordance with a preferred embodiment of the present invention.

FIG. 4 shows a flow diagram in accordance with a preferred embodiment of the present invention. Starting with Row 1 in pixel array 101, m rows are reset 401 at a time and per c clock cycles, and while not all rows of pixel array 101 are reset 402, we proceed to reset 403 the next m rows, iterating through all rows of pixel array 101 until all rows are reset 402. Pixel array 101 is then exposed 404 to image at hand. Following the exposure, the pixels' 102 exposure information is transferred into the storage elements 202 of the respective pixels 102. This is done m' rows at a time, starting with the simultaneous transfer of the exposure information stored in the photo sensitive elements 201 of the pixels 102 in the first m' rows 405 and, while not all rows are transferred 406, iterating through the remaining rows of the pixel array 101 transferring 407 the exposure information at the rate of m' rows at time. Once the exposure information in all rows is transferred 406, the stored exposure information is read out into the column readout element 104. This is done iteratively, starting with the first row 408 and, while not all rows are read out 409, iterating through the remaining rows of the pixel array 101 reading out 410 the exposure information of the next row until all rows are read out. The read exposure information is optionally transferred 411 to an external storage device, a processing element, a display element, an interface for relaying the stored exposure information to a network (optionally a wireless network), or any device or element or interface coupled to the image sensor 100 in order to receive the exposure information from image sensor 100.

Foregoing described embodiments of the invention are provided as illustrations and descriptions. They are not intended to limit the invention to precise form described. For example, the image sensor in the present invention can be implemented in a CMOS NMOS, bipolar, or bi-CMOS transistor device technology on a semiconductor substrate, such as silicon, silicon germanium, GaAs, InP, Group III-V, or Group II-VI. In particular, it is contemplated that functional implementation of invention described herein may be implemented equivalently in hardware, software, firmware, and/or other available functional components or building blocks. Other variations and embodiments are possible in light of above teachings, and it is thus intended that the scope of invention not be limited by this Detailed Description, but rather by claims following.

We claim:

1. A system for high-speed image capture, comprising:
a first clock;
a plurality of pixels being arranged in a plurality of pixel groups, the plurality of pixel groups having a first pixel group, each pixel in the plurality of pixels having a photo sensitive element and a storage element, the photo sensitive element producing an output indicative of incoming light; and
a control element coupled to the plurality of pixels, the control element resetting the plurality of pixel groups iteratively and at the rate of one pixel group in the plurality of pixel groups per one c clock cycle of the first clock, and the control element transferring the outputs of a plurality of photo sensitive elements in the first pixel group to a plurality of storage elements in the first pixel group, the transferring proceeding at the rate of one pixel group in the plurality of pixel groups per one c' clock cycle of the first clock and occurring simultaneously for all pixels in the first pixel group, wherein the first clock generates a first clock signal at a first rate, the first clock signal generating a second clock signal at a second rate, the second clock signal triggering an analog-to-digital converter (ADC).

2. A system for high-speed image capture, comprising:
a first clock;
a plurality of pixels being arranged in a plurality of pixel groups, the plurality of pixel groups having a first pixel group, each pixel in the plurality of pixels having a photo sensitive element and a storage element, the photo sensitive element producing an output indicative of incoming light; and
a control element coupled to the plurality of pixels, the control element resetting the plurality of pixel groups iteratively and at the rate of one pixel group in the plurality of pixel groups per one c clock cycle of the first clock, and the control element transferring the outputs of a plurality of photo sensitive elements in the first pixel group to a plurality of storage elements in the first pixel group, the transferring proceeding at the rate of one pixel group in the plurality of pixel groups per one c' clock cycle of the first clock and occurring simultaneously for all pixels in the first pixel group, wherein the first clock rate operates at a first frequency which is less than a multiple of the second clock rate operating at a second frequency.

3. A system for high-speed image capture, comprising:
a first clock;
a plurality of pixels being arranged in a plurality of pixel groups, the plurality of pixel groups having a first pixel group, each pixel in the plurality of pixels having a photo sensitive element and a storage element, the photo sensitive element producing an output indicative of incoming light; and
a control element coupled to the plurality of pixels, the control element resetting the plurality of pixel groups iteratively and at the rate of one pixel group in the plurality of pixel groups per one c clock cycle of the first clock, and the control element transferring the outputs of a plurality of photo sensitive elements in the first pixel group to a plurality of storage elements in the first pixel group, the transferring proceeding at the rate of one pixel group in the plurality of pixel groups per one c' clock cycle of the first clock and occurring simultaneously for all pixels in the first pixel group, wherein the first clock rate operates at a first frequency which is a multiple of the second clock rate operating at a second frequency.

4. The system of claim 1, wherein the plurality of pixels comprises an array, each pixel group in the plurality of pixel groups comprises one row of the array, c=1, and c'=1.

5. The system of claim 1, wherein the plurality of pixels comprises an array, each pixel group in the plurality of pixel groups comprises m rows of the array, and m>1.

6. The system of claim 1, wherein each pixel in the plurality of pixels comprises a four-transistor (4T) configuration.

7. The system of claim 1, wherein the photo sensitive element of a pixel in the plurality of pixels comprises a photodiode or a photogate or a PIN diode.

8. The system of claim 1, wherein the storage element of a pixel in the plurality of pixels comprises a capacitor.

9. A method for operating an image sensor, the image sensor having a plurality of pixels, the plurality of pixels having a plurality of pixel groups, the plurality of pixel groups having a first pixel group, each pixel in the plurality of pixels having a photo sensitive element and a storage element, the photo sensitive element producing an output indicative of incoming light, comprising:
(a) resetting the first pixel group in the plurality of pixel groups according to a timing of a first clock, the resetting occurring simultaneously for all pixels in the first pixel group;
(b) iteratively repeating the resetting step (a) and at a rate of one pixel group in the plurality of pixel groups per one c clock cycle of the first clock;
(c) transferring the outputs of a plurality of photo sensitive elements in the first pixel group to a plurality of storage elements in the first pixel group, the transferring occurring simultaneously for all the pixels in the first pixel group; and
(d) iteratively repeating the transferring step (c) and at a rate of one pixel group in the plurality of pixel groups per one c' clock cycle of the first clock, wherein the first clock generates a first clock signal at a first rate, the first clock signal generating a second clock signal at a second rate, the second clock signal triggering an analog-to-digital converter (ADC).

10. The method of claim 9, wherein c>0 and c'>0.

11. The method of claim 9, wherein the plurality of pixels comprises an array, each pixel group in the plurality of pixel groups comprises one row of the array, c=1, and c'=1.

12. The method of claim 9, wherein the plurality of pixels comprises an array, each pixel group in the plurality of pixel groups comprises m rows of the array, and m>1.

13. The method of claim 9, wherein each pixel in the plurality of pixels comprises a four-transistor (4T) configuration.

14. The method of claim 9, wherein the photo sensitive element of a pixel in the plurality of pixels comprises a photodiode or a photogate or a PIN diode.

15. The method of claim 9, wherein the storage element of a pixel in the plurality of pixels comprises a capacitor.

16. A system for high-speed image capture, comprising:
an array of pixels having rows of pixels, a first row in the rows of pixels having a first pixel and a second pixel, the first pixel having a first photo sensitive element and a first storage element, the first photo sensitive element producing a first output indicative of a first incoming light, the second pixel having a second photo sensitive element and a second storage element, the second photo sensitive element producing a second output indicative of a second incoming light; and
a control element, coupled to the array of pixels, the control element resetting rows of pixels iteratively at a rate of one row per one c clock cycle of a first clock, the control element transferring the first output of the first photo sensitive element to the first storage element, the control element transferring the second output of the second photo sensitive element to the second storage element, the control element transferring at the rate of one row per one c' clock cycle of the first clock, the transferring occurring simultaneously for the first and second pixels in the first row, wherein the first clock generates a first clock signal at a first rate, the first clock signal generating a second clock signal at a second rate, the second clock signal triggering an analog-to-digital converter (ADC).

17. The system of claim 1, wherein c>0 and c'>0.

18. The system of claim 2, wherein the plurality of pixels comprises an array, each pixel group in the plurality of pixel groups comprises one row of the array, c=1, and c'=1.

19. The system of claim 2, wherein the plurality of pixels comprises an array, each pixel group in the plurality of pixel groups comprises m rows of the array, and m>1.

20. The system of claim 2, wherein each pixel in the plurality of pixels comprises a four-transistor (4T) configuration.

21. The system of claim 2, wherein the photo sensitive element of a pixel in the plurality of pixels comprises a photodiode or a photogate or a PIN diode.

22. The system of claim 2, wherein the storage element of a pixel in the plurality of pixels comprises a capacitor.

23. The system of claim 2, wherein c>0 and c'>0.

24. The system of claim 3, wherein the plurality of pixels comprises an array, each pixel group in the plurality of pixel groups comprises one row of the array, c=1, and c'=1.

25. The system of claim 3, wherein the plurality of pixels comprises an array, each pixel group in the plurality of pixel groups comprises m rows of the array, and m>1.

26. The system of claim 3, wherein each pixel in the plurality of pixels comprises a four-transistor (4T) configuration.

27. The system of claim 3, wherein the photo sensitive element of a pixel in the plurality of pixels comprises a photodiode or a photogate or a PIN diode.

28. The system of claim 3, wherein the storage element of a pixel in the plurality of pixels comprises a capacitor.

29. The system of claim 3, wherein c>0 and c'>0.

30. A method for operating an image sensor, the image sensor having a plurality of pixels, the plurality of pixels having a plurality of pixel groups, the plurality of pixel groups having a first pixel group, each pixel in the plurality of pixels having a photo sensitive element and a storage element, the photo sensitive element producing an output indicative of incoming light, comprising:
(a) resetting the first pixel group in the plurality of pixel groups according to a timing of a first clock, the resetting occurring simultaneously for all pixels in the first pixel group;

(b) iteratively repeating the resetting step (a) and at a rate of one pixel group in the plurality of pixel groups per one c clock cycle of the first clock;

(c) transferring the outputs of a plurality of photo sensitive elements in the first pixel group to a plurality of storage elements in the first pixel group, the transferring occurring simultaneously for all the pixels in the first pixel group; and (d) iteratively repeating the transferring step (c) and at a rate of one pixel group in the plurality of pixel groups per one c' clock cycle of the first clock, wherein the first clock rate operates at a first frequency which is less than a multiple of the second clock rate operating at a second frequency.

31. The method of claim 30, wherein c>0 and c'>0.

32. The method of claim 30, wherein the plurality of pixels comprises an array, each pixel group in the plurality of pixel groups comprises one row of the array, c=1, and c'=1.

33. The method of claim 30, wherein the plurality of pixels comprises an array, each pixel group in the plurality of pixel groups comprises m rows of the array, and m>1.

34. The method of claim 30, wherein each pixel in the plurality of pixels comprises a four-transistor (4T) configuration.

35. The method of claim 30, wherein the photo sensitive element of a pixel in the plurality of pixels comprises a photodiode or a photogate or a PIN diode.

36. The method of claim 30, wherein the storage element of a pixel in the plurality of pixels comprises a capacitor.

37. A method for operating an image sensor, the image sensor having a plurality of pixels, the plurality of pixels having a plurality of pixel groups, the plurality of pixel groups having a first pixel group, each pixel in the plurality of pixels having a photo sensitive element and a storage element, the photo sensitive element producing an output indicative of incoming light, comprising:

(a) resetting the first pixel group in the plurality of pixel groups according to a timing of a first clock, the resetting occurring simultaneously for all pixels in the first pixel group;

(b) iteratively repeating the resetting step (a) and at a rate of one pixel group in the plurality of pixel groups per one c clock cycle of the first clock;

(c) transferring the outputs of a plurality of photo sensitive elements in the first pixel group to a plurality of storage elements in the first pixel group, the transferring occurring simultaneously for all the pixels in the first pixel group; and (d) iteratively repeating the transferring step (c) and at a rate of one pixel group in the plurality of pixel groups per one c' clock cycle of the first clock, wherein the first clock rate operates at a first frequency which is a multiple of the second clock rate operating at a second frequency.

38. The method of claim 37, wherein c>0 and c'>0.

39. The method of claim 9, wherein the plurality of pixels comprises an array, each pixel group in the plurality of pixel groups comprises one row of the array, c=1, and c'=1.

40. The method of claim 37, wherein the plurality of pixels comprises an array, each pixel group in the plurality of pixel groups comprises m rows of the array, and m>1.

41. The method of claim 37, wherein each pixel in the plurality of pixels comprises a four-transistor (4T) configuration.

42. The method of claim 37, wherein the photo sensitive element of a pixel in the plurality of pixels comprises a photodiode or a photogate or a PIN diode.

43. The method of claim 37, wherein the storage element of a pixel in the plurality of pixels comprises a capacitor.

44. A system for high-speed image capture, comprising:

an array of pixels having rows of pixels, a first row in the rows of pixels having a first pixel and a second pixel, the first pixel having a first photo sensitive element and a first storage element, the first photo sensitive element producing a first output indicative of a first incoming light, the second pixel having a second photo sensitive element and a second storage element, the second photo sensitive element producing a second output indicative of a second incoming light; and a control element, coupled to the array of pixels, the control element resetting rows of pixels iteratively at a rate of one row per one c clock cycle of a first clock, the control element transferring the first output of the first photo sensitive element to the first storage element, the control element transferring the second output of the second photo sensitive element to the second storage element, the control element transferring at the rate of one row per one c' clock cycle of the first clock, the transferring occurring simultaneously for the first and second pixels in the first row, wherein the first clock rate operates at a first frequency which is less than a multiple of the second clock rate operating at a second frequency.

45. A system for high-speed image capture, comprising:

an array of pixels having rows of pixels, a first row in the rows of pixels having a first pixel and a second pixel, the first pixel having a first photo sensitive element and a first storage element, the first photo sensitive element producing a first output indicative of a first incoming light, the second pixel having a second photo sensitive element and a second storage element, the second photo sensitive element producing a second output indicative of a second incoming light; and a control element, coupled to the array of pixels, the control element resetting rows of pixels iteratively at a rate of one row per one c clock cycle of a first clock, the control element transferring the first output of the first photo sensitive element to the first storage element, the control element transferring the second output of the second photo sensitive element to the second storage element, the control element transferring at the rate of one row per one c' clock cycle of the first clock, the transferring occurring simultaneously for the first and second pixels in the first row, wherein the first clock rate operates at a first frequency which is a multiple of the second clock rate operating at a second frequency.

* * * * *